United States Patent
Fukushi

(10) Patent No.: US 9,148,218 B2
(45) Date of Patent: Sep. 29, 2015

(54) OPTICAL RECEIVER, OPTICAL TRANSMISSION SYSTEM, AND SPAN-LOSS MONITORING METHOD

(71) Applicant: FUJITSU LIMITED, Kawasaki-shi, Kanagawa (JP)

(72) Inventor: Togo Fukushi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 14/030,138

(22) Filed: Sep. 18, 2013

(65) Prior Publication Data

US 2014/0086575 A1 Mar. 27, 2014

(30) Foreign Application Priority Data

Sep. 25, 2012 (JP) ................................ 2012-211582

(51) Int. Cl.
*H04B 10/07* (2013.01)
*H04B 10/69* (2013.01)

(52) U.S. Cl.
CPC .............. *H04B 10/07* (2013.01); *H04B 10/695* (2013.01)

(58) Field of Classification Search
USPC ............................... 398/25–28, 202, 208–210
See application file for complete search history.

(56) References Cited

U.S. PATENT DOCUMENTS

| | | |
|---|---|---|
| 2008/0232798 A1 | 9/2008 | Kasezawa |
| 2009/0269081 A1* | 10/2009 | Cai et al. ........................ 398/202 |
| 2010/0129081 A1* | 5/2010 | Onaka .............................. 398/81 |
| 2010/0178059 A1* | 7/2010 | Shou et al. ..................... 398/136 |
| 2012/0237215 A1* | 9/2012 | Wellbrock et al. .............. 398/37 |

FOREIGN PATENT DOCUMENTS

| | | |
|---|---|---|
| JP | 2000-201113 | 7/2000 |
| JP | 2008-236116 | 10/2008 |

* cited by examiner

*Primary Examiner* — David Payne
*Assistant Examiner* — Casey Kretzer
(74) *Attorney, Agent, or Firm* — Staas & Halsey LLP

(57) ABSTRACT

An optical receiver includes a converter configured to convert, into an electrical signal, an optical signal including error correction information, the optical signal being received from a transmitting side; a corrector configured to correct an error on the electrical signal, based on the error correction information; a threshold controller configured to control a threshold value discriminating a power of the electrical signal, based on a result of the error correction; a table configured to form therein data of a relationship between the threshold value and a power of an optical noise occurring when the optical signal is amplified within an optical transmission path; and a deriving unit configured to obtain the power of the optical noise corresponding to the threshold value from the table.

14 Claims, 12 Drawing Sheets

FIG. 5

| OPTIMUM POINT OF THRESHOLD VALUE [%] | SNR R [%] |
|---|---|
| 50.0 | 0.0 |
| 49.5 | 1.5 |
| 49.0 | 3.0 |
| 48.5 | 4.5 |
| ⋮ | ⋮ |
| 31.5 | 55.5 |
| 31.0 | 57.0 |
| 30.5 | 58.5 |
| 30.0 | 60.0 |

OPTICAL RECEIVER, OPTICAL TRANSMISSION SYSTEM, AND SPAN-LOSS MONITORING METHOD

CROSS-REFERENCE TO RELATED APPLICATION

This application is based upon and claims the benefit of priority of the prior Japanese Patent Application No. 2012-211582 filed on Sep. 25, 2012, the entire contents of which are incorporated herein by reference.

FIELD

The embodiments discussed herein are related to an optical receiver, an optical transmission system, and a span-loss monitoring method.

BACKGROUND

In the past, in an optical transmission system, in some cases, a distributed Raman amplifier (DRA) has been used. By injecting pump light into an optical transmission path and using the stimulated Raman scattering of the optical transmission path, the DRA amplifies an optical signal propagating through the optical transmission path. Using the DRA, the input power of the optical signal input to an optical receiver becomes large, and the ratio of optical signal power to optical noise power (signal to noise ratio: SNR) becomes large. Accordingly, a transmission characteristic is improved.

Incidentally, there has been a method where, by comparing bit data, obtained by the photoelectric conversion of a received optical signal, with a threshold value controlled by automatic threshold control (ATC), the error rate of digital output data is reduced. Such a method is disclosed in, for example, Japanese Laid-open Patent Publication No. 2000-201113. In addition, there has been a device where, on the basis of a result obtained by comparing an initial threshold value with a threshold value corresponding to the maximum power of an optical noise, by comparing one of the threshold values with the input power of an optical signal during operation, the detection accuracy of the loss of light is improved. Such a device is disclosed in, for example, Japanese Laid-open Patent Publication No. 2008-236116.

SUMMARY

According to an aspect of the invention, an optical receiver includes a converter configured to convert, into an electrical signal, an optical signal including error correction information, the optical signal being received from a transmitting side; a corrector configured to correct an error on the electrical signal, based on the error correction information; a threshold controller configured to control a threshold value discriminating a power of the electrical signal, based on a result of the error correction; a table configured to form therein data of a relationship between the threshold value and a power of an optical noise occurring when the optical signal is amplified within an optical transmission path; and a deriving unit configured to obtain the power of the optical noise corresponding to the threshold value from the table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of an SNR table;

DESCRIPTION OF EMBODIMENTS

In some cases, the gain of a DRA is controlled on the basis of a span loss between nodes. An upstream station notifies a downstream station of the transmission power of an optical signal. The downstream station monitors the input power of an optical signal. The span loss may be obtained by subtracting the input power of the optical signal in the downstream station from the transmission power of the optical signal from the upstream station.

However, if the optical signal monitored by the downstream station is included in a Raman gain band, an amount whose power increases owing to the gain of the DRA and an amount whose power increases owing to an optical noise generated by the DRA are included in the input power of the optical signal the downstream station monitors. Accordingly, it is desirable that the amounts whose powers increase owing to the two causes are subtracted from the input power of the optical signal.

For example, in an optical transmission system based on a wavelength division multiplexing (WDM) method, in some cases, the number or the allocation of wavelengths to be multiplexed is changed during the operation of the DRA. In those cases, sometimes a ratio between the optical signal monitored by the downstream station and the optical noise generated by the DRA changes. Owing to that change in the ratio based on the optical noise, an error occurs in the amount whose input power increases. Therefore, if it is difficult to measure, in real time, the amount whose input power increases on the basis of the optical noise, an error may occur in the value of the span loss.

Hereinafter, preferred embodiments of an optical receiver, an optical transmission system, and a span-loss monitoring method, which are capable of obtaining a span loss with a high degree of accuracy, will be described in detail with reference to the accompanying drawings. Hereinafter, in the description of each embodiment, the same symbol is assigned to the same configuration element, and the redundant description thereof will be omitted.

Examples of Optical Transmission System and Optical Receiver

Figure 1:
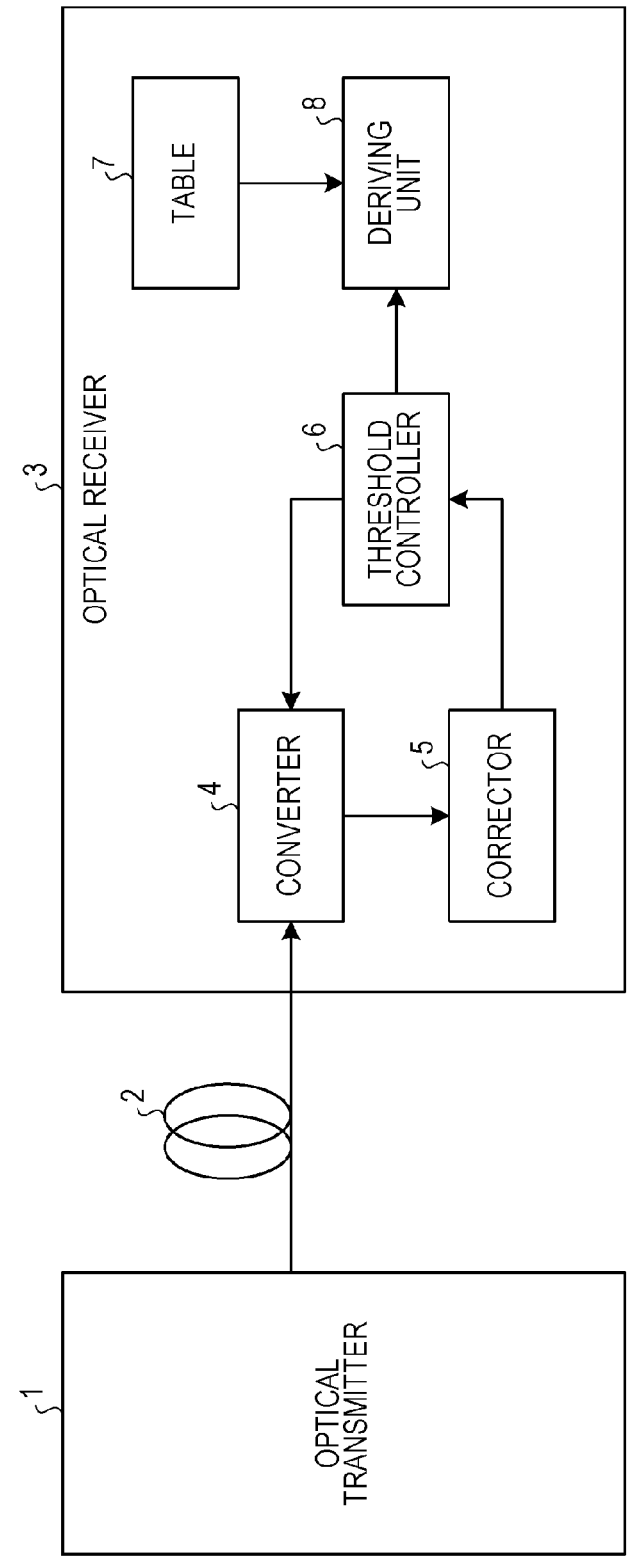
FIG. 1 is a diagram illustrating examples of an optical transmission system and an optical receiver according to an embodiment.

FIG. 1 is a diagram illustrating examples of an optical transmission system and an optical receiver according to an embodiment. As illustrated in FIG. 1, the optical transmission system includes, for example, an optical transmitter 1, an optical transmission path 2, and an optical receiver 3.

The optical transmitter 1 and the optical receiver 3 are connected to each other by the optical transmission path 2. As an example of the optical transmission path 2, an optical fiber may be used. The optical transmitter 1 transmits an optical signal including error correction information. The optical receiver 3 receives the optical signal transmitted over the optical transmission path 2. The optical receiver 3 includes a converter 4, a corrector 5, a threshold controller 6, a table 7, and a deriving unit 8.

The converter 4 converts the optical signal received by the optical receiver 3 into an electrical signal. As an example of the converter 4, a photodiode may be used. The photodiode converts the optical signal into the electrical signal, and generates a digital signal by comparing the electrical signal with a threshold value discriminating the power of the electrical signal. Based on the control the threshold controller 6, it may be possible for the converter 4 to change the threshold value.

On the basis of the error correction information, the corrector 5 performs error correction on the digital signal generated by the converter 4, and corrects a bit error. The corrector 5 counts the number of corrections to bit errors.

On the basis of the number of corrections to bit errors, counted by the corrector 5, the threshold controller 6 controls the threshold value used when the power of the electrical signal is discriminated in the converter 4. For example, the threshold controller 6 may also control the threshold value so that the number of corrections to bit errors becomes a minimum.

The table 7 stores therein a relationship between the power of an optical noise occurring when the optical signal is amplified within the optical transmission path 2 and the threshold value used when the power of the electrical signal is discriminated in the converter 4. If it is assumed that a threshold value, when the number of corrections to bit errors becomes a minimum, is the optimum point of the threshold value, between the power of the optical noise and the optimum point of the threshold value there may be a relationship where, for example, the optimum point of the threshold value decreases with an increase in the power of the optical noise and the optimum point of the threshold value increases with a decrease in the power of the optical noise.

From the table 7, the deriving unit 8 obtains the power of the optical noise corresponding to the optimum point of the threshold value. On the basis of the transmission power of the optical signal, the reception power of the optical signal in the optical receiver 3, the power of the optical noise obtained by the deriving unit 8, and a gain when the optical signal is amplified within the optical transmission path 2, the optical receiver 3 may also calculate a span loss in the optical transmission path 2 located between the optical transmitter 1 and the optical receiver 3. For example, the optical transmitter 1 may also notify the optical receiver 3 of the transmission power of the optical signal.

Example of Span-Loss Monitoring Method

Figure 2:
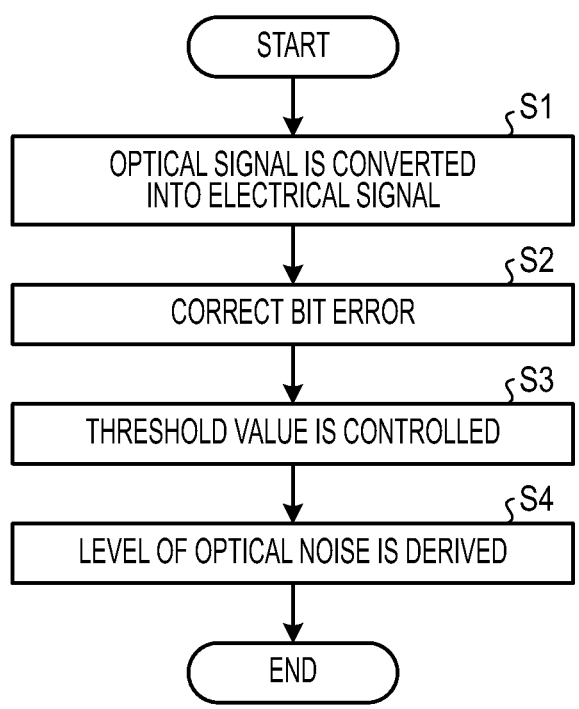
FIG. 2 is a diagram illustrating an example of a span-loss monitoring method according to an embodiment.

FIG. 2 is a diagram illustrating an example of a span-loss monitoring method according to an embodiment. The span-loss monitoring method illustrated in FIG. 2 may also be implemented by, for example, the optical receiver 3 illustrated in FIG. 1. In the present embodiment, the span-loss monitoring method illustrated in FIG. 2 will be described under the assumption that the span-loss monitoring method is implemented by the optical receiver 3 illustrated in FIG. 1.

As illustrated in FIG. 2, when the span-loss monitoring method has been started, the optical receiver 3 receives and converts the optical signal sent from the optical transmitter 1 into an electrical signal, by the converter 4 (operation S1). Error correction information is included in the optical signal. In addition, the converter 4 compares the electrical signal, generated by the conversion, with the threshold value discriminating the power of the electrical signal, and generates a digital signal.

Next, on the basis of the error correction information, the corrector 5 performs error correction on the digital signal generated by the converter 4, and corrects a bit error (operation S2). At that time, the corrector 5 counts the number of corrections to bit errors.

Next, on the basis of the number of corrections to bit errors, the threshold controller 6 controls the threshold value used when the power of the electrical signal is discriminated in the converter 4 (operation S3). Next, from the table 7, the deriving unit 8 obtains the power of the optical noise corresponding to the threshold value used when the power of the electrical signal is discriminated in the converter 4 (operation S4).

The optical receiver 3 may also calculate a span loss in the optical transmission path 2 located between the optical transmitter 1 and the optical receiver 3 on the basis of, for example, the transmission power of the optical signal notified from the optical transmitter 1, the reception power of the optical signal in the optical receiver 3, the power of the optical noise, and the gain of amplification. In addition, the optical receiver 3 terminates a series of processing operations. During operation, the optical receiver 3 repeatedly implements a series of processing operations illustrated in FIG. 2.

According to the optical receiver 3 illustrated in FIG. 1, during the operation of the optical receiver 3, on the basis of the error correction result of a reception signal, the optimum point of the threshold value is obtained. Accordingly, from the table 7, the power of the optical noise is obtained that corresponds to the optimum point of the threshold value. The span loss in the optical transmission path 2 located between the optical transmitter 1 and the optical receiver 3 is calculated using the power of the optical noise during the operation of the optical receiver 3, and hence, the span loss during operation may be obtained with a high degree of accuracy.

Other Examples of Optical Transmission System and Optical Receiver

Figure 3:
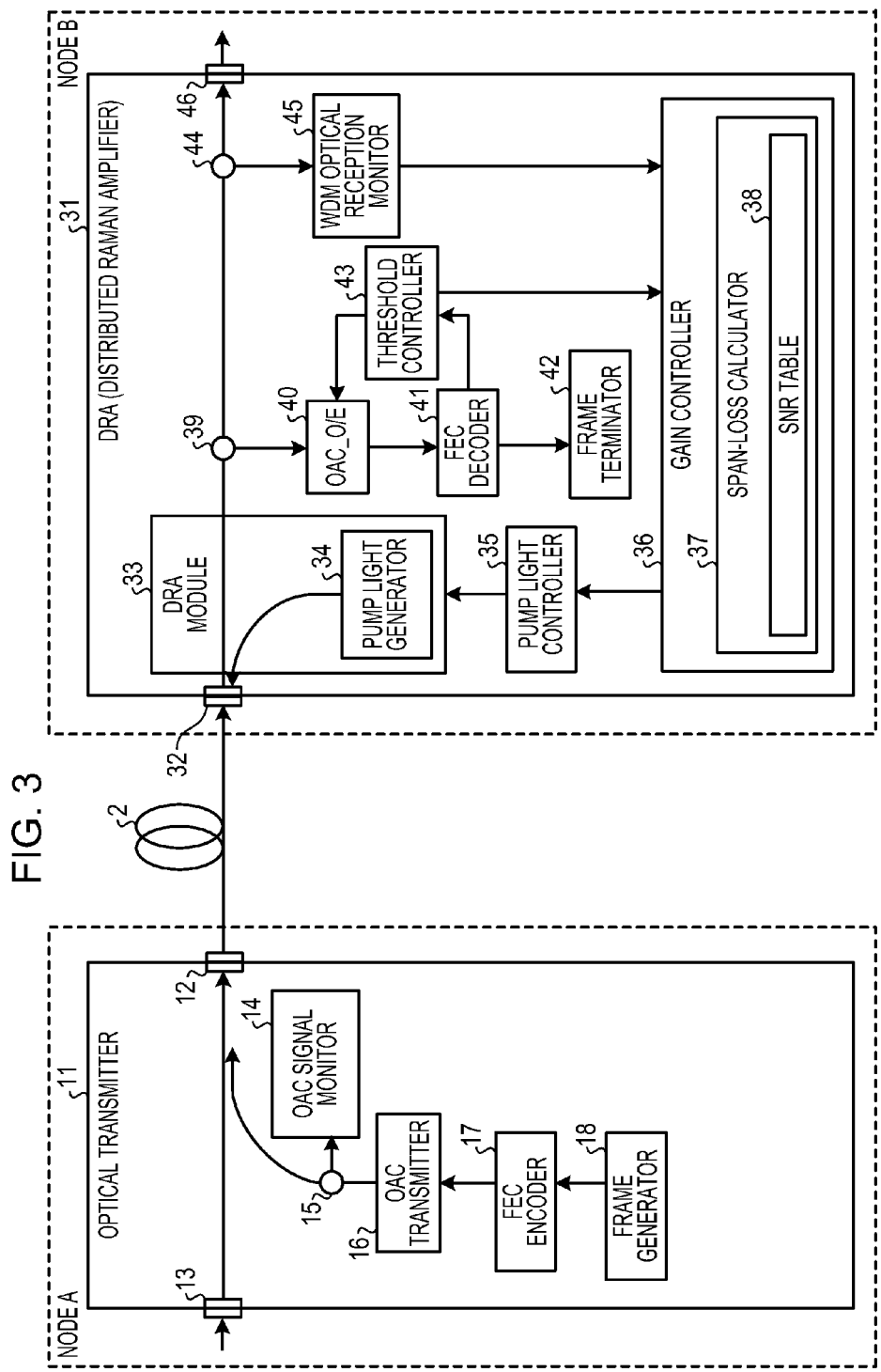
FIG. 3 is a diagram illustrating other examples of an optical transmission system and an optical receiver according to an embodiment.

FIG. 3 is a diagram illustrating other examples of an optical transmission system and an optical receiver according to an embodiment. As illustrated in FIG. 3, in a system where a node A and a node B face each other, the optical transmission system includes, for example, an optical transmitter 11 in the node A and a DRA 31 in the node B. The DRA 31 is an example of the optical receiver.

The output port 12 of the optical transmitter 11 and the input port 32 of the DRA 31 are connected to each other by the optical transmission path 2. As an example of the optical transmission path 2, an optical fiber may be used.

From a circuit that is provided in the node A and whose illustration is omitted, an optical signal is input to the input port 13 of the optical transmitter 11. The optical transmitter 11 includes an OAC (optical auxiliary channel) signal monitor 14, an optical splitter 15, an OAC transmitter 16, an FEC (forward error correction) encoder 17, and a frame generator 18.

The frame generator 18 maps, to the frame of an OAC signal, information to be transmitted to the station of the facing node B. The OAC signal is a signal used for notifying a station on a transmitting side of a Raman gain in a station on a receiving side. The optical transmission system illustrated in FIG. 3 will be described under the assumption that the optical transmitter 11 in the node A transmits the OAC signal and the DRA 31 in the node B monitors a span loss by receiving the OAC signal sent from the optical transmitter 11 in the node A. It may be expressed to set or assign information in an area of a frame (for example, an OAC signal) by using "map" and it may be expressed to extract information from an area of a frame (for example, an OAC signal) by using "demap" in this specification.

The FEC encoder 17 assigns FEC information to the frame of the OAC signal generated by the frame generator 18. The OAC transmitter 16 converts, into an optical signal, the OAC signal to which the FEC information is added, and outputs the optical signal. As an example of the OAC transmitter 16, a laser diode may be used.

The optical splitter 15 causes the OAC signal output from the OAC transmitter 16 to be split into, for example, two branches, sends one thereof to the OAC signal monitor 14, and sends the other to the output port 12. As an example of the optical splitter 15, an optical coupler may be used.

On the basis of the OAC signal output from the optical splitter 15, the OAC signal monitor 14 monitors the transmission power of the OAC signal. As an example of the OAC signal monitor 14, a photodiode may be used. The information of the transmission power of the OAC signal, obtained by the OAC signal monitor 14, is an example of information to be transmitted to the station of the facing node B with being mapped on the OAC signal, and is transmitted to the DRA 31 with being mapped on the OAC signal.

The OAC signal branched to the output port 12 side is multiplexed with an optical signal input from the input port 13, and set from the output port 12 to the optical transmission path 2. After that, so as to be discriminated from the OAC signal, the optical signal input from the input port 13 of the optical transmitter 11 is expressed as an optical main signal, in some cases. For example, the optical main signal and the OAC signal may be different in wavelength. The optical signal sent from the output port 12 travels within the optical transmission path 2 to reach the input port 32 of the DRA 31.

The DRA 31 includes a DRA module 33. The DRA module 33 inputs a pump light from the input port 32 to the optical transmission path 2 in a direction opposite to the optical main signal. Accordingly, the optical main signal is amplified that travels within the optical transmission path 2 so as to be headed from the output port 12 of the optical transmitter 11 to the input port 32 of the DRA 31. The DRA module 33 includes a pump light generator 34. As an example of the pump light generator 34, a pump laser diode used for Raman amplification may be used.

The DRA 31 includes an optical demultiplexer 39, an OAC_O/E 40, an FEC decoder 41, a frame terminator 42, and a threshold controller 43. The OAC_O/E 40 is an example of the converter. The FEC decoder 41 is an example of the corrector. The threshold controller 43 is an example of the threshold controller.

The optical demultiplexer 39 demultiplexes an optical signal input from the input port 32 into the optical main signal and the OAC signal, sends the optical main signal to the output port 46 of the DRA 31, and sends the OAC signal to the OAC_O/E 40. As an example of the optical demultiplexer 39, a band filter may be used.

The OAC_O/E 40 subjects the OAC signal output from the optical demultiplexer 39 to photoelectric conversion, and generates the OAC signal serving as an electrical signal. The OAC_O/E 40 may change a threshold value used for identifying whether the voltage power of the OAC signal is high or low. The OAC_O/E 40 monitors the reception power of the OAC signal. As an example of the OAC_O/E 40, a photodiode may be used.

On the basis of the FEC information added to the OAC signal, the FEC decoder 41 performs error correction for the OAC signal. The FEC decoder 41 counts the number of corrections to bit errors, and notifies the threshold controller 43 of the number of corrections to bit errors.

While changing the threshold value, the threshold controller 43 performs feedback control on the OAC_O/E 40 so that the number of corrections to bit errors the FEC decoder 41 gives notice of becomes a minimum. The threshold controller 43 notifies an after-mentioned gain controller 36 of a threshold value when the number of corrections to bit errors becomes a minimum. In some cases, the threshold value when the number of corrections to bit errors becomes a minimum is expressed as the optimum point of the threshold value.

The frame terminator 42 is a termination circuit for the OAC signal output from the FEC decoder 41. The frame terminator 42 extracts a piece of information such as a warning mapped on the frame of the OAC signal, a performance monitor, or a control signal.

The DRA 31 includes an optical splitter 44 and a WDM optical reception monitor 45. The optical splitter 44 causes the optical main signal output from the optical demultiplexer 39 to be split into, for example, two branches, sends one thereof to the WDM optical reception monitor 45, and sends the other to the output port 46. As an example of the optical splitter 44, an optical coupler may be used.

On the basis of the optical main signal output from the optical splitter 44, the WDM optical reception monitor 45 monitors the reception power of the optical main signal. As an example of the WDM optical reception monitor 45, a photodiode may be used.

The optical main signal branched to the output port 46 side is output from the output port 46. The optical main signal output from the output port 46 is sent to a circuit that is provided in the node B and whose illustration is omitted.

The DRA 31 includes the gain controller 36, a span-loss calculator 37, and an SNR table 38. The span-loss calculator 37 is an example of the deriving unit. The SNR table 38 is an example of the table. While, in the example illustrated in FIG. 3, the span-loss calculator 37 is included in the gain controller 36, the span-loss calculator 37 may also be independent from the gain controller 36. While, in the example illustrated in FIG. 3, the SNR table 38 is included in the span-loss calculator 37, the SNR table 38 may also be independent from the span-loss calculator 37.

In the SNR table 38, a relationship between the ratio R of the power of the optical noise in the band of the OAC signal to the entire reception power of the optical signal in the band of the OAC signal and the optimum point of the threshold value the threshold controller 43 gives notice of is stored. The SNR table 38 may also be stored in, for example, a memory. In some cases, the ratio R of the power of the optical noise in the band of the OAC signal to the entire reception power of the optical signal in the band of the OAC signal is expressed as an SNR R. FIG. 5 illustrates an example of the SNR table 38.

On the basis of the entire reception power of the optical signal in the band of the OAC signal, the optimum point of the threshold value the threshold controller 43 gives notice of, and the SNR table 38, the span-loss calculator 37 derives the power of the optical noise. By calculating, for example, the following Expression (1), the span-loss calculator 37 may also derive the power of the optical noise. In the Expression (1), "R" means the SNR R. The entire reception power of the OAC signal means the entire reception power of the optical signal in the band of the OAC signal.

[Optical Noise Power (mW)]=$R/(100+R)$×[Entire Reception Power of OAC Signal (mW)]   (1)

On the basis of pieces of information such as the entire reception power of the optical signal in the band of the OAC signal, the transmission power of the OAC signal, the optical noise power derived from the Expression (1), and the Raman gain, the span-loss calculator 37 calculates the span loss in the optical transmission path 2 located between the node A and the node B. The transmission power of the OAC signal is given notice of by the optical transmitter 11 in the facing node B with being mapped on the OAC signal.

The entire reception power of the optical signal in the band of the OAC signal includes the reception power of the OAC signal other than the optical noise and the Raman gain, an amount whose power increases owing to the gain of the DRA 31, and an amount whose power increases owing to the optical noise generated by the DRA 31. Accordingly, by calculating, for example, the following Expression (2), the span-loss calculator 37 may derive the span loss. In the Expression (2), the entire reception power of the OAC signal means the entire reception power of the optical signal in the band of the OAC signal. A Raman gain means the gain of the DRA 31.

[Span Loss (dB)]=[Transmission Power of OAC Signal (dBm)]−[Reception Power of OAC Signal (dB)]=[Transmission Power of OAC Signal (dBm)]−{10 log([Entire Reception Power of OAC Signal (mW)]−[Optical Noise Power (mW)])−[Raman Gain (dB)]}   (2)

On the basis of pieces of information such as the reception power of the optical main signal received from the WDM optical reception monitor 45 and the span loss obtained owing to the span-loss calculator 37, the gain controller 36 monitors the current Raman gain. On the basis of the monitoring result of the current Raman gain, the gain controller 36 decides the setting value of the pump light generator 34 so that the targeted Raman gain is obtained.

The DRA 31 includes a pump light controller 35. The pump light controller 35 sets, in the pump light generator 34, the setting value of the pump light generator 34, decided by the gain controller 36.

Figure 4:
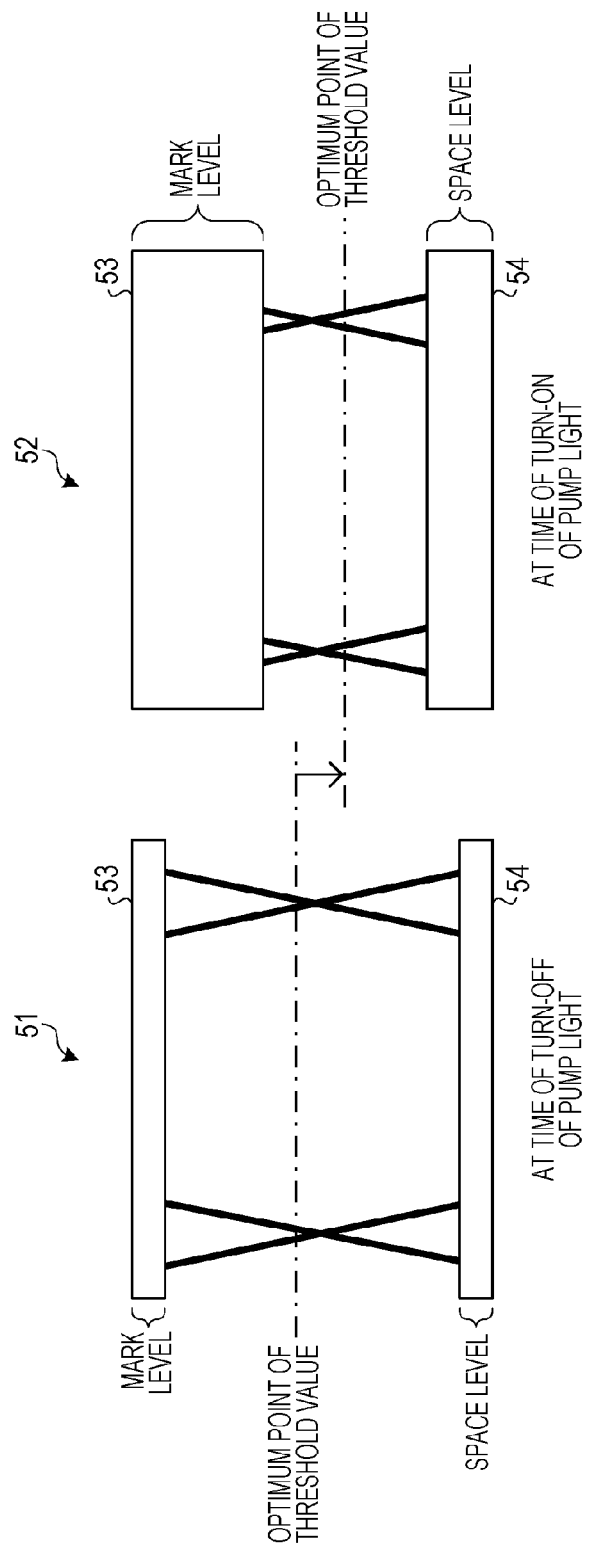
FIG. 4 is a diagram explaining a relationship between a power of an optical noise and an optimum point of a threshold value.

Relationship Between Power of Optical Noise and Optimum Point of Threshold Value FIG. 4 is a diagram explaining a relationship between the power of an optical noise and the optimum point of a threshold value. In FIG. 4, on the left side, an eye pattern 51 is illustrated that indicates, for example, a signal waveform when the pump light of the DRA 31 is in an off-state. In FIG. 4, on the right side, an eye pattern 52 is illustrated that indicates, for example, a signal waveform when the pump light of the DRA 31 is in an on-state.

When, at the time of the on-state of the pump light, the mixing ratio of the optical noise to the band of the OAC signal becomes high, a beat noise occurs between the OAC signal and an amplified spontaneous scattering (ASS) optical noise due to a Raman light leaking into the band of the OAC signal. Accordingly, as illustrated in FIG. 4, in the eye pattern, the width of an optical noise 53 on a mark level side becomes larger than the width of an optical noise 54 on a space level side. Therefore, the optimum point of the threshold value decreases.

Example of SNR Table

FIG. 5 is a diagram illustrating an example of an SNR table. As illustrated in FIG. 5, for example, when the optimum point of the threshold value is 50.0%, an SNR R may also be 0.0%. While not being specifically limited, for example, in the SNR table 38 illustrated in FIG. 5, when the optimum point of the threshold value decreases by 0.5%, the SNR R increases by 1.5%. While, for example, in the SNR table 38 illustrated in FIG. 5, the optimum point of the threshold value is set with the step size of 0.5%, the step size may also be set so as to be finer than 0.5% or rougher than 0.5%.

The optimum point of the threshold value in the SNR table 38 may also be set in accordance with the resolution of the threshold value in the threshold controller 43. In this case, from the SNR table 38, the SNR R is obtained that corresponds to the optimum point of the threshold value the threshold controller 43 gives notice of.

The optimum point of the threshold value in the SNR table 38 may also be set so as to be finer than the resolution of the threshold value in the threshold controller 43. Also in this case, from the SNR table 38, the SNR R is obtained that corresponds to the optimum point of the threshold value the threshold controller 43 gives notice of.

The optimum point of the threshold value in the SNR table 38 may also be set so as to be rougher than the resolution of the threshold value in the threshold controller 43. In this case, from the SNR table 38, the SNR R is obtained that is nearest to the optimum point of the threshold value the threshold controller 43 gives notice of. Alternatively, owing to the linear approximation of the SNR R corresponding to a threshold value that is nearest to the optimum point of the threshold value the threshold controller 43 gives notice of and larger and the SNR R corresponding to a threshold value that is nearest to the optimum point of the threshold value the threshold controller 43 gives notice of and smaller, the SNR R may also be obtained.

For example, at the time of the design of the DRA 31, experiments may be performed using a band filter having the same wavelength passband characteristic as the wavelength passband characteristic of the optical demultiplexer 39, and hence, the SNR table 38 may also be created. In this way, it may be possible to easily create the SNR table 38.

Alternatively, at the time of the initial optical communication of the DRA 31, the transmission power of the pump light transmitted from the pump light generator 34 may be controlled while the disconnection and restoration of the OAC signal transmitted from a facing station are repeated, and hence, the SNR table 38 may also be created. In this way, it may be possible to easily create the SNR table 38 in an actual optical transmission system.

According to the DRA 31 illustrated in FIG. 3, during the operation of the DRA 31, on the basis of the error correction result of the OAC signal transmitted from the optical transmitter 11 in the facing node A, the optimum point of the threshold value is obtained. Accordingly, it may be possible to obtain the SNR R corresponding to the optimum point of the threshold value, from the SNR table 38, and it may be possible to obtain the power of the optical noise on the basis of the SNR R and the entire reception power of the optical signal in the band of the OAC signal. In addition, on the basis of the transmission power of the OAC signal the transmitting side gives notice of, the reception power of the OAC signal, the power of the optical noise, and the current Raman gain, the span loss in the optical transmission path 2 located between the nodes is calculated, and hence, it may be possible to obtain the span loss during operation with a high degree of accuracy.

According to the DRA 31 illustrated in FIG. 3, the Raman gain based on the span loss is decided by the gain controller 36, the transmission power is controlled by the pump light generator 34 on the basis of the Raman gain, and the pump light is output from the pump light generator 34. Accordingly, during operation, the Raman gain is controlled with a high degree of accuracy.

Another Example of Optical Receiver

Figure 6:
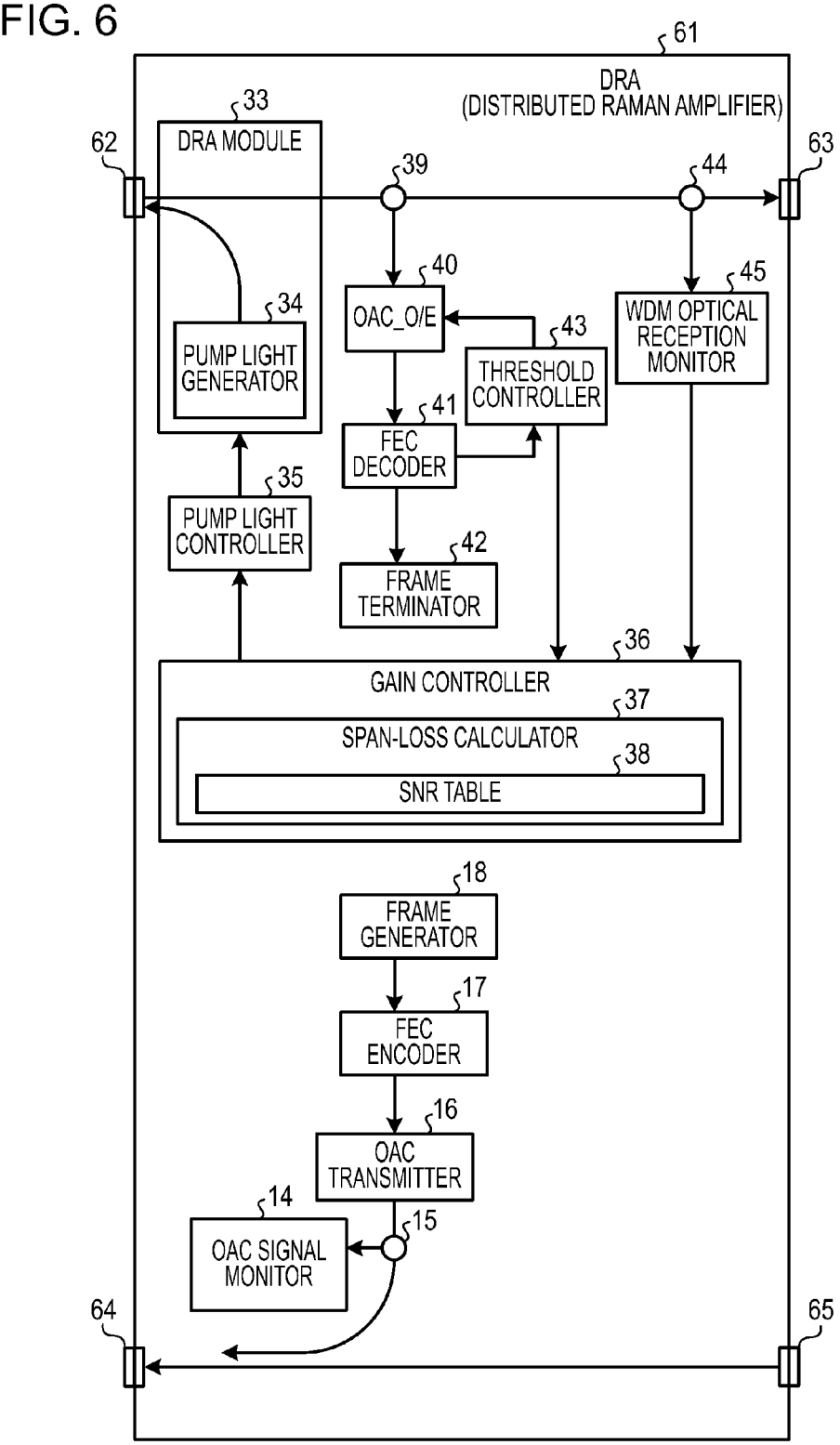
FIG. 6 is a diagram illustrating another example of an optical receiver according to an embodiment.

FIG. 6 is a diagram illustrating another example of an optical receiver according to an embodiment. As illustrated in FIG. 6, a DRA 61 is an example of the optical receiver. The DRA 61 adopts a configuration including the configuration of the DRA 31 illustrated in FIG. 3 and the configuration of the optical transmitter 11 illustrated in FIG. 3.

In other words, as a system receiving an optical signal transmitted from a facing node, the DRA 61 includes the optical demultiplexer 39, the OAC_O/E 40, the FEC decoder 41, the frame terminator 42, the optical splitter 44, and the WDM optical reception monitor 45. In addition, as a system performing Raman amplification and control for the Raman amplification, the DRA 61 includes the threshold controller 43, the gain controller 36, the span-loss calculator 37, the SNR table 38, the pump light controller 35, and the DRA module 33 including the pump light generator 34. Since these individual functional units 33 to 45 are as described in the description of the DRA 31 illustrated in FIG. 3, the redundant descriptions thereof will be omitted.

An input port 62 on the receiving side of the DRA 61 is connected to an optical transmission path such as an optical fiber. The optical signal output from the facing node travels within the optical transmission path to reach the input port 62 on the receiving side of the DRA 61. The DRA module 33 inputs the pump light from the input port 62 on the receiving side to the optical transmission path in a direction opposite to the optical signal sent from the facing node.

The optical main signal demultiplexed by the optical demultiplexer 39 reaches an output port 63 on the receiving side of the DRA 61. The output port 63 on the receiving side is connected to an optical transmission path not illustrated, and owing to this optical transmission path, the optical main signal is sent from the output port 63 on the receiving side to a circuit at a subsequent stage.

In addition, as a system transmitting the OAC signal to a facing node, the DRA 61 includes the frame generator 18, the FEC encoder 17, the OAC transmitter 16, the optical splitter 15, and the OAC signal monitor 14. Since these individual functional units 14 to 18 are as described in the description of the optical transmitter 11 illustrated in FIG. 3, the redundant descriptions thereof will be omitted.

An input port 65 on the transmitting side of the DRA 61 and an output port 64 on the transmitting side thereof are individually connected to optical transmission paths which are not illustrated. From a circuit that is located at a preceding stage and not illustrated, an optical main signal is input to the input port 65 on the transmitting side. The OAC signal branched to the output port 64 side on the transmitting side by the optical splitter 15 is multiplexed with the optical main signal input from the input port 65 on the transmitting side, and sent from the output port 64 on the transmitting side to the optical transmission path. Example of Hardware Configuration of Optical Receiver Illustrated in FIG. 6

Figure 7:
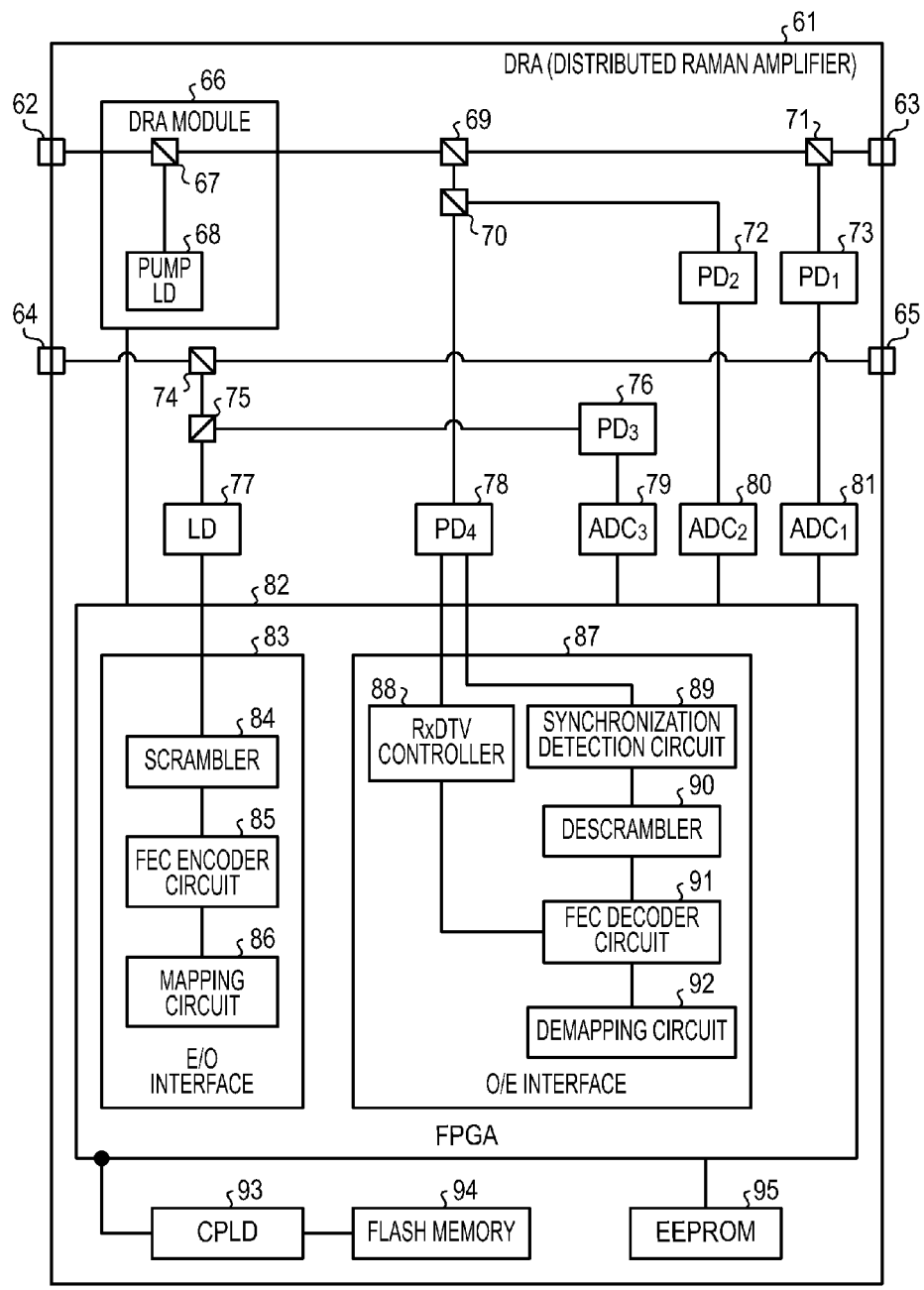
FIG. 7 is a diagram illustrating an example of a hardware configuration of the optical receiver illustrated in FIG. 6.
Figure 8:
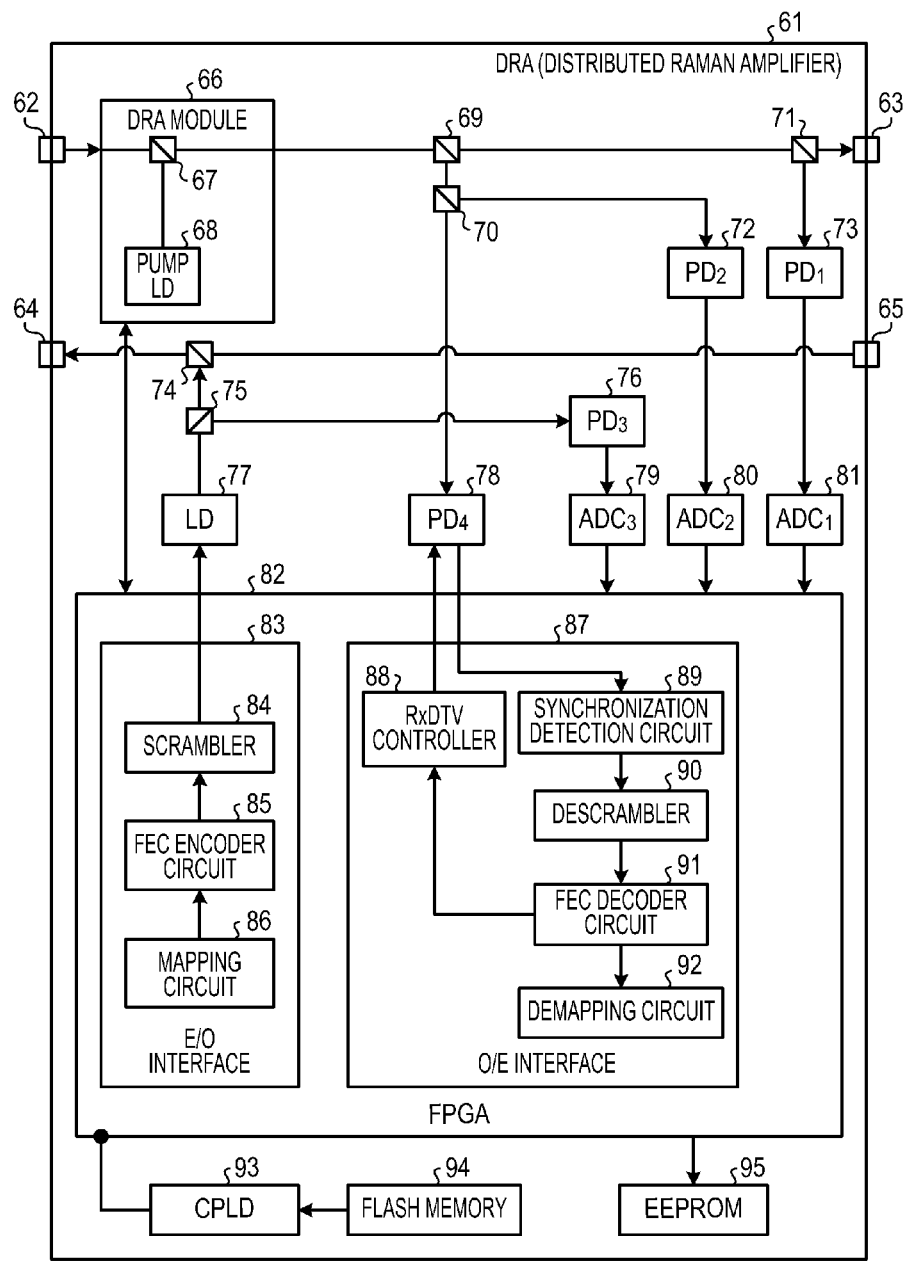
FIG. 8 is a diagram illustrating a flow of a signal in the optical receiver illustrated in FIG. 7.

FIG. 7 is a diagram illustrating an example of the hardware configuration of the optical receiver illustrated in FIG. 6. FIG. 8 is a diagram illustrating the flow of a signal in an optical receiver illustrated in FIG. 7.

As illustrated in FIG. 7 and FIG. 8, the DRA 61 includes the input port 62 on the receiving side, the output port 63 on the receiving side, the output port 64 on the transmitting side, and the input port 65 on the transmitting side. The input port 62 on the receiving side is connected to the optical transmission path. Through the optical transmission path from the facing node, the optical signal is sent where an optical main signal and an OAC signal are multiplexed with each other.

The output port 63 on the receiving side is connected to the circuit at the subsequent stage. From the output port 63 on the receiving side, an optical main signal is output that is extracted from the optical signal input from the input port 62 on the receiving side, within the DRA 61.

The input port 65 on the transmitting side is connected to the circuit at the preceding stage. The optical main signal to be transmitted to a facing node is input to the input port 65 on the transmitting side. The output port 64 on the transmitting side is connected to the optical transmission path. From the output port 64 on the transmitting side, an optical signal is output where the OAC signal is multiplexed with the optical main signal input from the input port 65 on the transmitting side.

In addition, the DRA 61 includes a DRA module 66 and a field programmable gate array (FPGA) 82. The DRA module 66 output a pump light used for performing distributed Raman amplification. The DRA module 66 includes an optical coupler 67 and a pump laser diode (pump LD) 68. The pump laser diode 68 is an example of the pump light generator 34. In FIG. 7 and FIG. 8, a laser diode is expressed as an LD.

The pump laser diode 68 is connected to the optical coupler 67. The pump laser diode 68 outputs pump light. The output power of the pump light is controlled by the FPGA 82. Owing to the pump light output from the pump laser diode 68, an optical main signal sent from the facing node is amplified within the optical transmission path connected to the input port 62 side on the receiving side.

The optical coupler 67 is connected to the input port 62 on the receiving side. The optical coupler 67 causes the pump light output from the pump laser diode 68 to be multiplexed with the optical signal sent from the facing node, and causes the pump light to be output to the optical transmission path side connected to the input port 62 on the receiving side.

In addition, the DRA 61 includes an OAC filter 69, an optical coupler 70, a fourth photodiode ($PD_4$) 78, a second photodiode ($PD_2$) 72, and a second analog-to-digital converter ($ADC_2$) 80. The OAC filter 69 is an example of the optical demultiplexer 39. The fourth photodiode 78 is an example of the OAC_O/E 40. The second photodiode 72 and the second analog-to-digital converter 80 correspond to an example of the OAC_O/E 40. In FIG. 7 and FIG. 8, the xth photodiode is expressed as a $PD_x$, and the xth analog-to-digital converter is expressed as an $ADC_x$.

The OAC filter 69 is connected to the optical coupler 67. The OAC filter 69 demultiplexes the optical signal output from the optical coupler 67 into the optical main signal and the OAC signal, sends the optical main signal to the output port 63 on the receiving side, and sends the OAC signal to the fourth photodiode 78. As an example of the OAC filter 69, a band filter may be used.

The optical coupler 70 is connected to the OAC filter 69. The optical coupler 70 splits the OAC signal output from the OAC filter 69 into, for example, two branches, and sends one thereof to the fourth photodiode 78, and sends the other to the second photodiode 72.

The fourth photodiode 78 is connected to the optical coupler 70. The fourth photodiode 78 converts the OAC signal output from the optical coupler 70 into an electrical signal having a digital value. A threshold value used at the time of converting into the digital value is controlled by the FPGA 82. The OAC signal that is output from the fourth photodiode 78 and serves as the electrical signal is set to the FPGA 82.

The second photodiode 72 is connected to the optical coupler 70. The second photodiode 72 converts the OAC signal output from the optical coupler 70 into an electrical signal, and monitors the reception power of the OAC signal.

The second analog-to-digital converter 80 is connected to the second photodiode 72. The second analog-to-digital converter 80 converts, into a digital value, the analog electrical signal output from the second photodiode 72. The digital value of the reception power of the OAC signal output from the second analog-to-digital converter 80 is sent to the FPGA 82.

In addition, the DRA 61 includes an optical coupler 71, a first photodiode ($PD_1$) 73, and a first analog-to-digital converter ($ADC_1$) 81. The optical coupler 71 is an example of the optical splitter 44, and the first photodiode 73 and the first analog-to-digital converter 81 correspond to an example of the WDM optical reception monitor 45.

The optical coupler 71 is connected to the OAC filter 69 and the output port 63 on the receiving side. The optical coupler 71 splits the optical main signal output from the OAC filter 69 into, for example, two branches, sends one thereof to the first photodiode 73, and sends the other to the output port 63 on the receiving side.

The first photodiode 73 is connected to the optical coupler 71. The first photodiode 73 converts, into an electrical signal, the optical main signal output from the optical coupler 71, and monitors the reception power of the optical main signal.

The first analog-to-digital converter 81 is connected to the first photodiode 73. The first analog-to-digital converter 81 converts, into a digital value, the analog electrical signal output from the first photodiode 73. The digital value of the reception power of the optical main signal output from the first analog-to-digital converter 81 is sent to the FPGA 82.

In addition, the DRA 61 includes optical couplers 74 and 75, a laser diode 77, a third photodiode 76, and a third analog-to-digital converter 79. The optical coupler 75 is an example of the optical splitter 15, the laser diode 77 is an example of the OAC transmitter 16, and the third photodiode ($PD_3$) 76 and the third analog-to-digital converter ($ADC_3$) 79 correspond to an example of the OAC signal monitor 14.

The laser diode (LD) 77 is connected to the FPGA 82. The laser diode 77 converts, into the OAC signal serving as an optical signal, the OAC signal that is output from the FPGA 82 and serves as an electrical signal.

The optical coupler 75 is connected to the laser diode 77. The optical coupler 75 splits the OAC signal output from the laser diode 77 into, for example, two branches, sends one thereof to the optical coupler 74, and sends the other to the third photodiode 76.

The optical coupler 74 is connected to the optical coupler 75, the input port 65 on the transmitting side, and the output port 64 on the transmitting side. The optical coupler 74 causes the main signal input from the input port 65 on the transmitting side and the OAC signal output from the optical coupler 75 to be multiplexed with each other, and outputs the main signal and the OAC signal to the output port 64 on the transmitting side.

The third photodiode 76 is connected to the optical coupler 75. The third photodiode 76 converts, into an electrical signal, the OAC signal output from the optical coupler 75, and monitors the transmission power of the OAC signal.

The third analog-to-digital converter 79 is connected to the third photodiode 76. The third analog-to-digital converter 79 converts, into a digital value, the analog electrical signal output from the third photodiode 76. The digital value output from the third analog-to-digital converter 79 is sent to the FPGA 82.

In addition, the DRA 61 includes the FPGA 82. The FPGA 82 is a type of logic device where a program is rewritable. The FPGA 82 corresponds to examples of the pump light controller 35, the gain controller 36, the span-loss calculator 37, the FEC decoder 41, the frame terminator 42, the threshold controller 43, the frame generator 18, and the FEC encoder 17.

The FPGA 82 is connected to the DRA module 66, the laser diode 77, the fourth photodiode 78, the third analog-to-digital converter 79, the second analog-to-digital converter 80, and the first analog-to-digital converter 81. On the basis of the OAC signal, the reception power of the OAC signal, the reception power of the optical main signal, and the transmission power of the OAC signal, the FPGA 82 controls the DRA 61. An E/O interface 83 and an O/E interface 87 are provided in the FPGA 82.

The O/E interface 87 is an interface for the fourth photodiode 78. The O/E interface 87 includes an RxDTV controller 88, a synchronization detection circuit 89, a descrambler 90, an FEC decoder circuit 91, and a demapping circuit 92. The RxDTV controller 88 is an example of the threshold controller 43. The FEC decoder circuit 91 is an example of the FEC decoder 41. The demapping circuit 92 is an example of the frame terminator 42.

The synchronization detection circuit 89 is connected to the fourth photodiode 78. The synchronization detection circuit 89 performs synchronization detection on the OAC signal output from the fourth photodiode 78.

The descrambler 90 is connected to the synchronization detection circuit 89. The descrambler 90 performs descrambling processing on the OAC signal output from the synchronization detection circuit 89, and returns, to the original data sequence of the OAC signal, a data sequence converted by a scrambler in the facing node on the transmitting side.

The FEC decoder circuit 91 is connected to the descrambler 90. The FEC decoder circuit 91 performs error correction on the OAC signal on the basis of the FEC information assigned to the OAC signal output from the descrambler 90. In addition, the FEC decoder circuit 91 counts the number of error corrections to the OAC signal.

The RxDTV controller 88 is connected to the FEC decoder circuit 91 and the fourth photodiode 78. On the basis of the count value of the number of error corrections, output from the FEC decoder circuit 91, the RxDTV controller 88 controls a threshold value used when the OAC signal is converted into an electrical signal having a digital value in the fourth photodiode 78, and the RxDTV controller 88 obtains the optimum point of the threshold value.

The demapping circuit 92 is connected to the FEC decoder circuit 91. The demapping circuit 92 performs demapping processing on the OAC signal that has been subjected to the error correction and output from the FEC decoder circuit 91, and extracts information mapped on the frame of the OAC signal. As an example of the extracted information, a warning, a performance monitor, an internode control signal, or the like may be used.

The E/O interface 83 is an interface for the laser diode 77. The E/O interface 83 includes a scrambler 84, an FEC encoder circuit 85, and a mapping circuit 86. The FEC encoder circuit 85 is an example of the FEC encoder 17. The mapping circuit 86 is an example of the frame generator 18.

The mapping circuit 86 performs mapping processing on the frame of the OAC signal, and maps information to be mapped on the frame of the OAC signal, to the frame of the OAC signal. As an example of the information to be mapped on the frame of the OAC signal, a warning, a performance monitor, an internode control signal, or the like may be used.

The FEC encoder circuit 85 is connected to the mapping circuit 86. The FEC encoder circuit 85 assigns the FEC information to the OAC signal output from the mapping circuit 86.

The scrambler 84 is connected to the FEC encoder circuit 85 and the laser diode 77. The scrambler 84 performs scramble processing on the OAC signal output from the FEC encoder circuit 85, and converts the data sequence of the OAC signal so that a mark rate becomes, for example, 50%. The scrambler 84 outputs the OAC signal after the scramble processing, to the laser diode 77.

In addition, the DRA 61 includes a complex programmable logic device (CPLD) 93 and a flash memory 94. The SNR table 38 may also be stored in the flash memory 94.

The flash memory 94 is connected to the CPLD 93. The flash memory 94 is a non-volatile read only memory (ROM) that is collectively erasable and rewritable. In the flash memory 94, various kinds of data such as the configuration data of the FPGA 82 may be stored.

The CPLD 93 is connected to the FPGA 82. The CPLD 93 is a type of logic device where a program is rewritable. The CPLD 93 transfers, to the FPGA 82, the configuration data of the FPGA 82, stored in, for example, the flash memory 94.

In addition, the DRA 61 includes an electrically erasable and programmable read only memory (EEPROM) 95. The SNR table 38 may also be stored in the EEPROM 95.

The EEPROM 95 is connected to the FPGA 82. The EEPROM 95 is an electrically rewritable non-volatile ROM. In the EEPROM 95, adjustment data or the like may be stored that is different with respect to, for example, each individual DRA 61.

According to the DRA 61 illustrated in FIG. 6, in each of facing nodes, it may be possible to use the DRA 61 as an optical receiver and an optical transmitter. Example of Optical Transmission System Utilizing Optical Receiver Illustrated in FIG. 6

Figure 9:
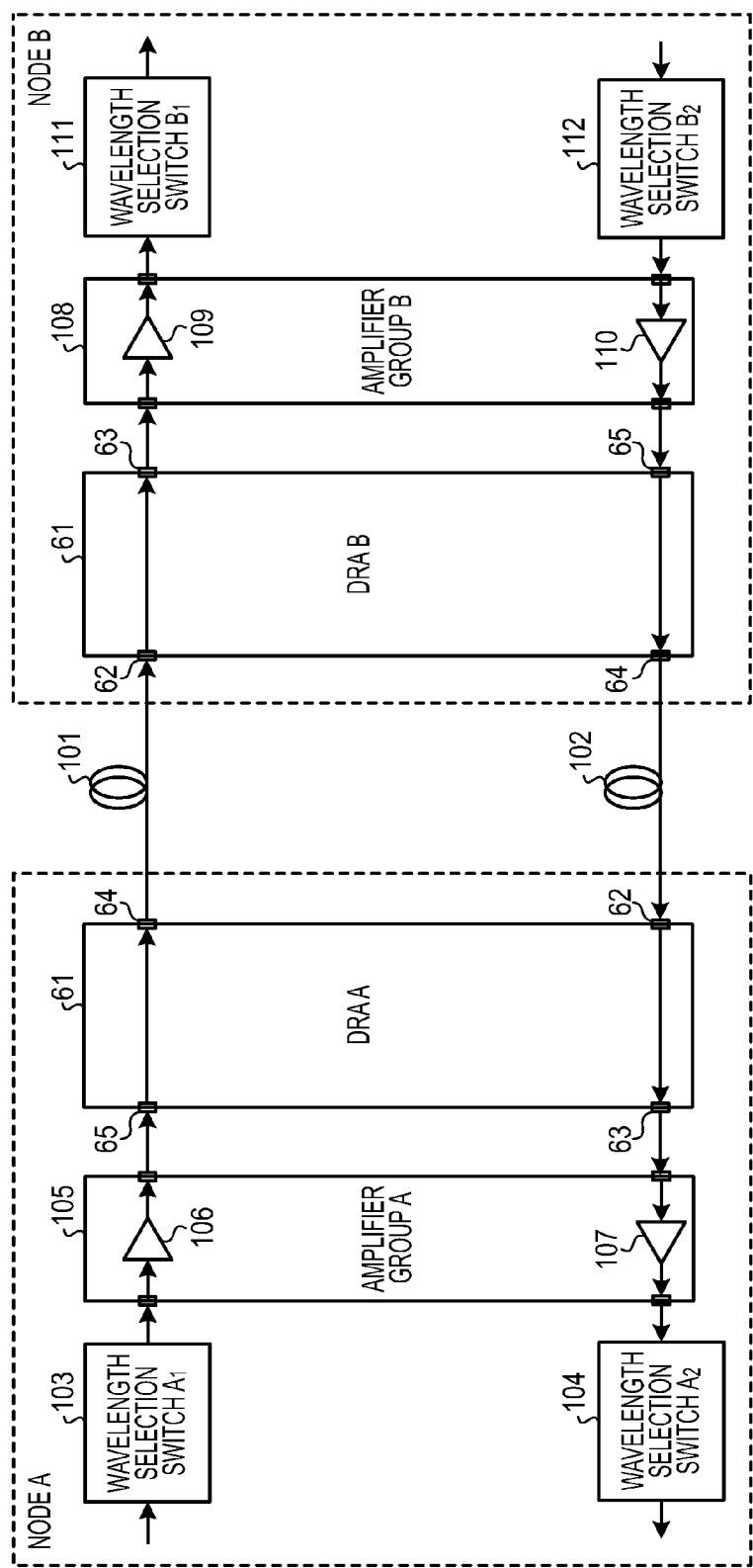
FIG. 9 is a diagram illustrating an example of an optical transmission system utilizing the optical receiver illustrated in FIG. 6.

FIG. 9 is a diagram illustrating an example of an optical transmission system utilizing the optical receiver illustrated in FIG. 6. As illustrated in FIG. 9, in each of a node A and a node B facing each other, the DRA 61 is used as an optical receiver and an optical transmitter.

In this case, the output port 64 on the transmitting side of a DRA A 61 in the node A and the input port 62 on the receiving side of a DRA B 61 in the node B are connected to each other owing an optical transmission path 101 such as an optical fiber. In addition, the input port 62 on the receiving side of the DRA A 61 in the node A and the output port 64 on the transmitting side of the DRA B 61 in the node B are connected to each other by an optical transmission path 102 such as an optical fiber.

In the node A, in addition to the DRA A 61, for example, a wavelength selection switch $A_1$ 103, a wavelength selection switch $A_2$ 104, and an amplifier group A 105 are provided. In the amplifier group A 105, a post-amplifier 106 and a pre-amplifier 107 are provided.

In an optical transmission system based on a wavelength division multiplexing method, from a circuit that is located at a preceding stage and whose illustration is omitted, an optical main signal subjected to wavelength multiplexing and an optical signal that is to be multiplexed with the optical main signal and has a desired wavelength are input to the wavelength selection switch $A_1$ 103. The wavelength selection switch $A_1$ 103 multiplexes the optical main signal and the optical signal having a desired wavelength with each other. From the wavelength selection switch $A_1$ 103, the optical main signal is output that is subjected to wavelength multiplexing.

The post-amplifier 106 collectively amplifies the optical main signal output from the wavelength selection switch $A_1$ 103. The post-amplifier 106 may also be, for example, a fiber amplifier to which the ions of a rare-earth element such as erbium are added. The optical main signal output from the post-amplifier 106 is input to the input port 65 on the transmitting side of the DRA A 61.

The optical main signal output from the output port 63 on the receiving side of the DRA A 61 is input to the pre-amplifier 107. The pre-amplifier 107 collectively amplifies the optical main signal output from the output port 63 on the receiving side. The pre-amplifier 107 may also be, for example, a fiber amplifier to which the ions of a rare-earth element such as erbium are added. The optical main signal output from the pre-amplifier 107 is input to the wavelength selection switch $A_2$ 104.

The wavelength selection switch $A_2$ 104 causes an optical signal having a desired wavelength to be demultiplexed from the optical main signal subjected to wavelength multiplexing. The main signal and the optical signal having a desired wavelength, output from the wavelength selection switch $A_2$ 104, are sent to a circuit that is located at a subsequent stage and whose illustration is omitted.

In the node B, in addition to the DRA B 61, for example, a wavelength selection switch $B_1$ 111, a wavelength selection switch $B_2$ 112, and an amplifier group B 108 are provided. In the amplifier group B 108, a pre-amplifier 109 and a post-amplifier 110 are provided.

In the optical transmission system based on a wavelength division multiplexing method, from a circuit that is located at a preceding stage and whose illustration is omitted, an optical main signal subjected to wavelength multiplexing and an optical signal that is to be multiplexed with the optical main signal and has a desired wavelength are input to the wavelength selection switch $B_2$ 112. The wavelength selection switch $B_2$ 112 multiplexes the optical main signal and the optical signal having a desired wavelength with each other. From the wavelength selection switch $B_2$ 112, the optical main signal is output that is subjected to wavelength multiplexing.

The post-amplifier 110 collectively amplifies the optical main signal output from the wavelength selection switch $B_2$ 112. The post-amplifier 110 may also be, for example, a fiber amplifier to which the ions of a rare-earth element such as erbium are added. The optical main signal output from the post-amplifier 110 is input to the input port 65 on the transmitting side of the DRA B 61.

The optical main signal output from the output port 63 on the receiving side of the DRA B 61 is input to the pre-amplifier 109. The pre-amplifier 109 collectively amplifies the optical main signal output from the output port 63 on the receiving side. The pre-amplifier 109 may also be, for example, a fiber amplifier to which the ions of a rare-earth element such as erbium are added. The optical main signal output from the pre-amplifier 109 is input to the wavelength selection switch $B_1$ 111.

The wavelength selection switch $B_1$ 111 causes an optical signal having a desired wavelength to be demultiplexed from the optical main signal subjected to wavelength multiplexing. The main signal and the optical signal having a desired wavelength, output from the wavelength selection switch $B_1$ 111, are sent to a circuit that is located at a subsequent stage and whose illustration is omitted.

Another Example of Span-Loss Monitoring Method

Figure 10:
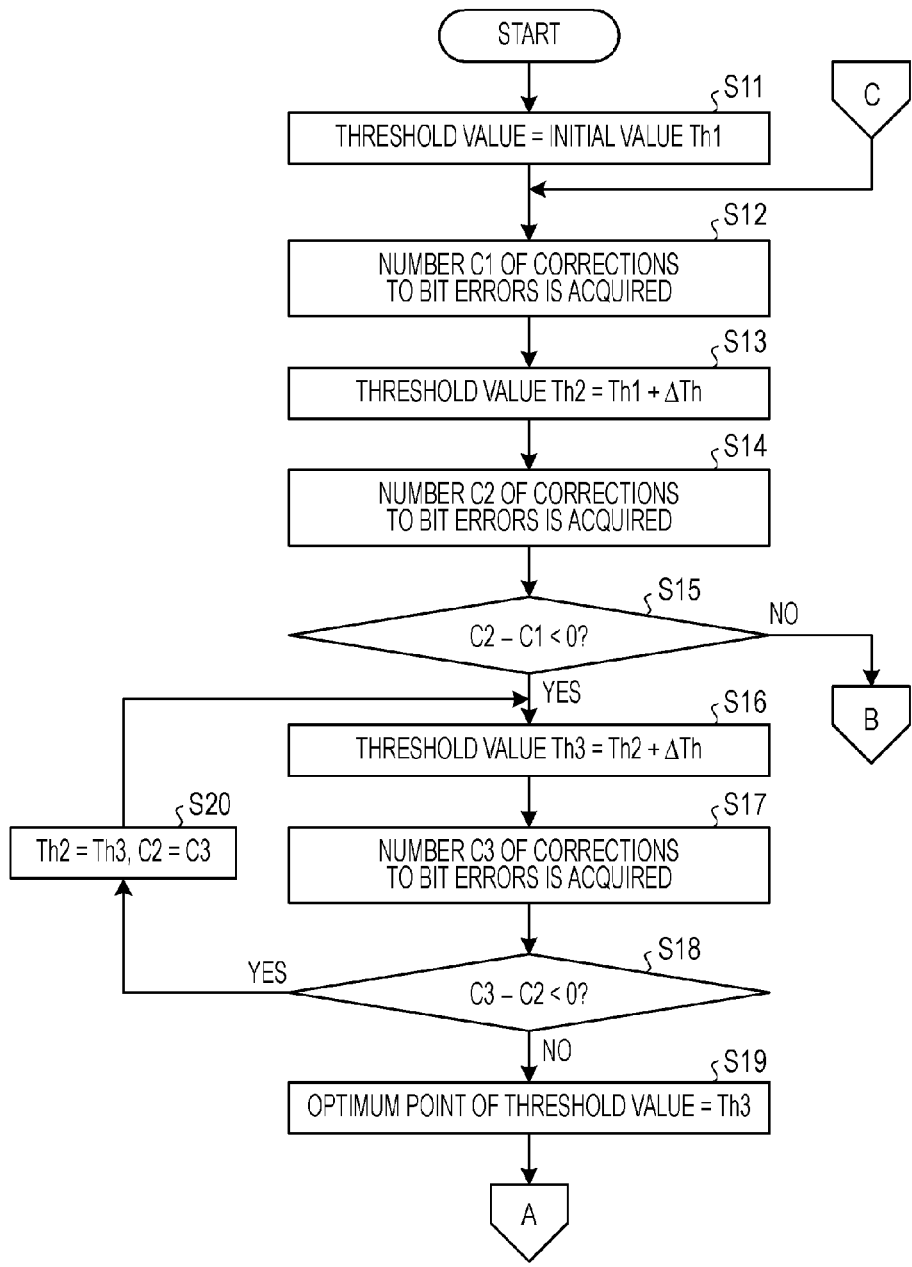
FIG. 10 is a diagram illustrating another example of a span-loss monitoring method according to an embodiment.
Figure 11:
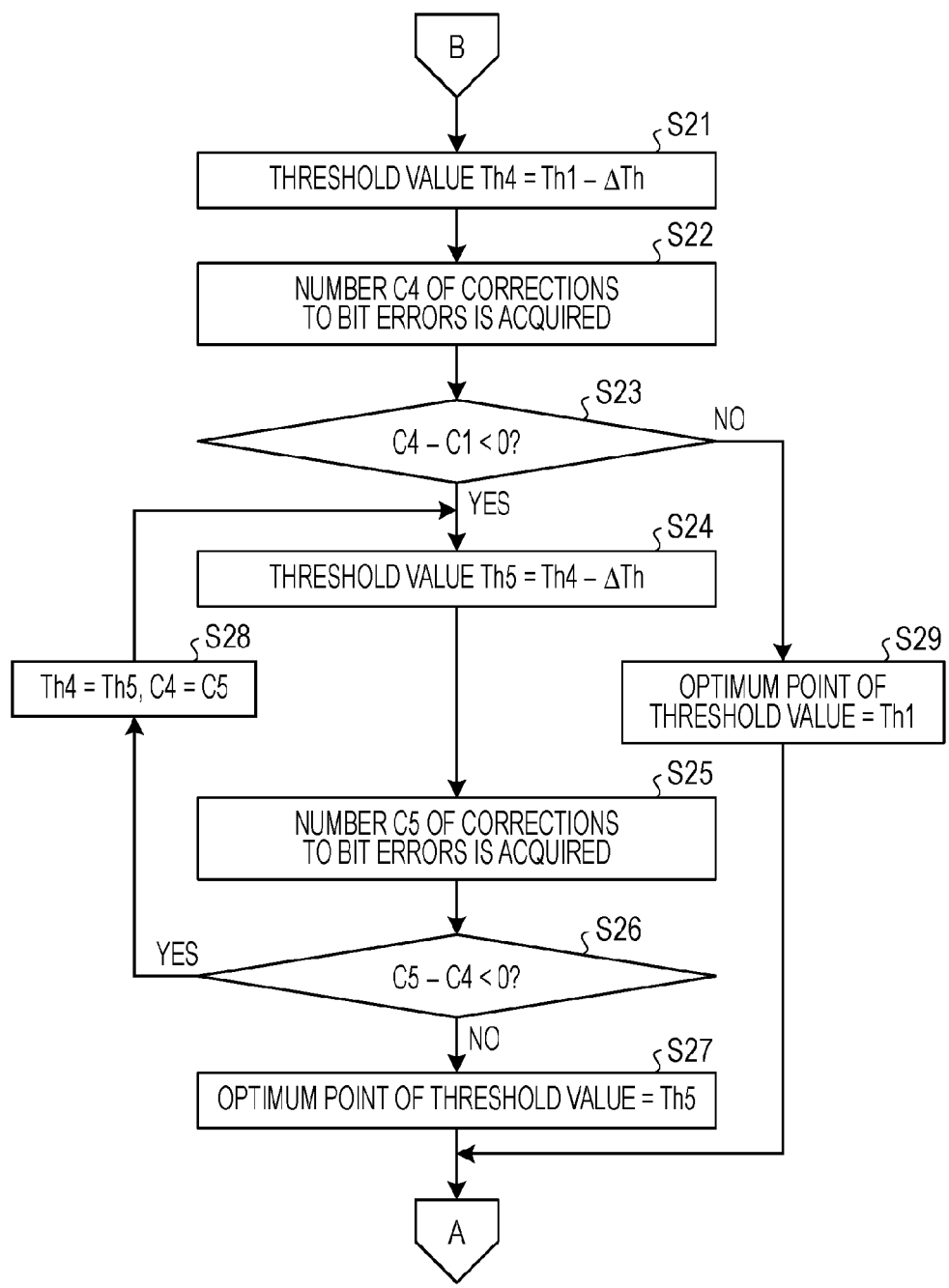
FIG. 11 is a diagram illustrating a portion following FIG. 10.
Figure 12:
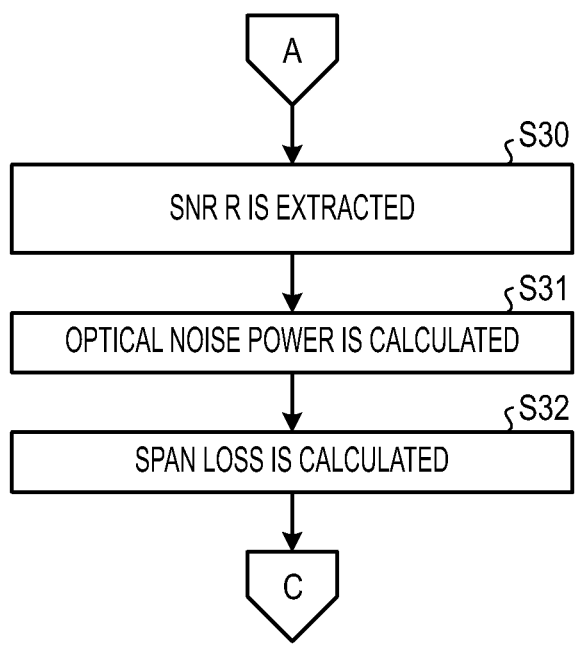
FIG. 12 is a diagram illustrating another portion following FIG. 10.

FIG. 10 is a diagram illustrating another example of a span-loss monitoring method according to an embodiment. FIG. 11 and FIG. 12 are diagrams illustrating portions following FIG. 10. The span-loss monitoring method illustrated in FIG. 10 to FIG. 12 may be implemented by, for example, the DRA 31 illustrated in FIG. 3 or the DRA 61 illustrated in FIG. 6. In the present embodiment, the span-loss monitoring method illustrated in FIG. 10 to FIG. 12 will be described under the assumption that the span-loss monitoring method is implemented by the DRA 61 illustrated in FIG. 6.

As illustrated in FIG. 10, when the span-loss monitoring method has been started, the threshold controller 43 sets, to an initial value Th1, a threshold value used for discriminating the OAC signal in the OAC_O/E 40 (operation S11). The initial value Th1 may be, for example, 50.0%.

The OAC_O/E 40 sets the threshold value to the Th1, and converts the OAC signal into a digital value. On the basis of the FEC information added to the OAC signal, the FEC decoder 41 performs bit error correction on the digital value output from the OAC_O/E 40.

Next, the threshold controller 43 acquires, from the FEC decoder 41, the number C1 of corrections to bit errors when the threshold value is the Th1 (operation S12). Next, the threshold controller 43 adds the minimum resolution ΔTh of the threshold value to the threshold value Th1, and defines as a new threshold value Th2 (operation S13). While the minimum resolution ΔTh of the threshold value is dependent on the RxDTV controller 88, when the ΔTh is, for example, 0.2%, if the ΔTh is added to the Th1, the Th2 becomes 50.2%.

The OAC_O/E 40 sets the threshold value to the Th2, and converts the OAC signal into a digital value. On the basis of the FEC information added to the OAC signal, the FEC decoder 41 performs bit error correction on the digital value output from the OAC_O/E 40.

Next, the threshold controller 43 acquires, from the FEC decoder 41, the number C2 of corrections to bit errors when the threshold value is the Th2 (operation S14). In addition, the span-loss calculator 37 subtracts the C1 from the C2. When the result of the subtraction is not smaller than "0" (operation S15: No), the processing proceeds to an operation S21 in FIG. 11.

As illustrated in FIG. 11, the threshold controller 43 subtracts the ΔTh from the Th1, and defines as a new threshold value Th4 (operation S21). When the ΔTh is, for example, 0.2%, if the ΔTh is subtracted from the Th1, the Th4 becomes 49.8%.

The OAC_O/E 40 sets the threshold value to the Th4, and converts the OAC signal into a digital value. On the basis of the FEC information added to the OAC signal, the FEC decoder 41 performs bit error correction on the digital value output from the OAC_O/E 40.

Next, the threshold controller 43 acquires, from the FEC decoder 41, the number C4 of corrections to bit errors when the threshold value is the Th4 (operation S22). In addition, the span-loss calculator 37 subtracts the C1 from the C4. When the result of the subtraction is not smaller than "0" (operation S23: No), the threshold controller 43 sets the optimum point of the threshold value to the initial value Th1 (operation S29).

On the other hand, as illustrated in FIG. 10, when the result obtained by subtracting the C1 from the C2 is smaller than "0" in the operation S15 (operation S15: Yes), the threshold controller 43 adds the ΔTh to the Th2, and defines as a new threshold value Th3 (operation S16). When the ΔTh is, for example, 0.2%, if the ΔTh is added to the Th2, the Th3 becomes 50.4%.

The OAC_O/E 40 sets the threshold value to the Th3, and converts the OAC signal into a digital value. On the basis of the FEC information added to the OAC signal, the FEC decoder 41 performs bit error correction on the digital value output from the OAC_O/E 40.

Next, the threshold controller 43 acquires, from the FEC decoder 41, the number C3 of corrections to bit errors when the threshold value is the Th3 (operation S17). In addition, the span-loss calculator 37 subtracts the C2 from the C3. When the result of the subtraction is not smaller than "0" (operation S18: No), the threshold controller 43 sets the optimum point of the threshold value to the Th3 (operation S19). When the optimum point of the threshold value has been decided, the processing proceeds to an operation S30 in FIG. 12. Processing operations in and after the operation S30 will be described later.

When the result obtained by subtracting the C2 from the C3 is smaller than "0" in the operation S18 (operation S18: Yes), the threshold controller 43 defines the current Th3 as the new Th2, and defines the current C3 as the new C2 (operation S20). In addition, the threshold controller 43 adds the ΔTh to the new Th2, and defines as the new threshold value Th3 (operation S16). When the ΔTh is, for example, 0.2%, if the ΔTh is added to the new Th2, the new Th3 becomes 50.6%.

The OAC_O/E 40 sets the threshold value to the new Th3, and converts the OAC signal into a digital value. On the basis of the FEC information added to the OAC signal, the FEC decoder 41 performs bit error correction on the digital value output from the OAC_O/E 40.

Next, the threshold controller 43 acquires, from the FEC decoder 41, the new number C3 of corrections to bit errors when the threshold value is the new Th3 (operation S17). In addition, the span-loss calculator 37 subtracts the new C2 from the new C3. When the result of the subtraction is smaller than "0" (operation S18: Yes), the operation S20 and the operation S16 to the operation S18 are repeated until the result of the subtraction becomes "0" or more.

When the result of the subtraction becomes "0" or more (operation S18: No), the optimum point of the threshold value when the number of corrections to bit errors is the lowest may be found. Accordingly, the threshold controller 43 sets the optimum point of the threshold value to the Th3 when the result of the subtraction becomes "0" or more (operation S19). When the optimum point of the threshold value has been decided, the processing proceeds to the operation S30 in FIG. 12. The processing operations in and after the operation S30 will be described later.

On the other hand, as illustrated in FIG. 11, when the result obtained by subtracting the C1 from the C4 is smaller than "0" in the operation S23 (operation S23: Yes), the threshold controller 43 subtracts the ΔTh from the Th4, and defines as a new threshold value Th5 (operation S24). When the ΔTh is, for example, 0.2%, if the ΔTh is subtracted from the Th4, the Th5 becomes 49.6%.

The OAC_O/E 40 sets the threshold value to the Th5, and converts the OAC signal into a digital value. On the basis of the FEC information added to the OAC signal, the FEC decoder 41 performs bit error correction on the digital value output from the OAC_O/E 40.

Next, the threshold controller 43 acquires, from the FEC decoder 41, the number C5 of corrections to bit errors when the threshold value is the Th5 (operation S25). In addition, the span-loss calculator 37 subtracts the C4 from the C5. When the result of the subtraction is not smaller than "0" (operation S26: No), the threshold controller 43 sets the optimum point of the threshold value to the Th5 (operation S27). When the optimum point of the threshold value has been decided, the processing proceeds to the operation S30 in FIG. 12. The processing operations in and after the operation S30 will be described later.

When the result obtained by subtracting the C4 from the C5 is smaller than "0" in the operation S26 (operation S26: Yes), the threshold controller 43 defines the current Th5 as the new Th4, and defines the current C5 as the new C4 (operation S28). In addition, the threshold controller 43 subtracts the ΔTh from the new Th4, and defines as the new threshold value Th5 (operation S24). When the ΔTh is, for example, 0.2%, if the ΔTh is subtracted from the new Th4, the new Th5 becomes 49.4%.

The OAC_O/E 40 sets the threshold value to the new Th5, and converts the OAC signal into a digital value. On the basis of the FEC information added to the OAC signal, the FEC decoder 41 performs bit error correction on the digital value output from the OAC_O/E 40.

Next, the threshold controller 43 acquires, from the FEC decoder 41, the new number C5 of corrections to bit errors when the threshold value is the new Th5 (operation S25). In addition, the span-loss calculator 37 subtracts the new C4 from the new C5. When the result of the subtraction is smaller than "0" (operation S26: Yes), the operation S28 and the operation S24 to the operation S26 are repeated until the result of the subtraction becomes "0" or more.

When the result of the subtraction becomes "0" or more (operation S26: No), the optimum point of the threshold value when the number of corrections to bit errors is the lowest may be found. Accordingly, the threshold controller 43 sets the optimum point of the threshold value to the Th5 when the result of the subtraction becomes "0" or more (operation S27). When the optimum point of the threshold value has been decided, the processing proceeds to the operation S30 in FIG. 12.

When the optimum point of the threshold value has been decided in the operation S19, the operation S27, or the operation S29, the span-loss calculator 37 refers to the SNR table 38 as illustrated in FIG. 12. In addition, from the SNR table 38, the span-loss calculator 37 extracts the SNR R corresponding to the optimum point of the threshold value (operation S30).

Next, the span-loss calculator 37 may also acquire, from the OAC_O/E 40, the entire reception power of the optical signal in the band of the OAC signal. In addition, using the SNR R and the entire reception power of the optical signal in the band of the OAC signal, the span-loss calculator 37 calculates the above-mentioned Expression (1), and calculates the power of the optical noise (operation S31). For example, in a case where the SNR R is 1.2% and the entire reception power of the optical signal in the band of the OAC signal is 0.003 mW, when these values are substituted into the above-mentioned Expression (1) to calculate the Expression (1), the power of the optical noise becomes about 0.0000356 mW.

Next, the span-loss calculator 37 acquires the transmission power of the OAC signal and the Raman gain in a facing node. The transmission power of the OAC signal may also be given notice of by, for example, the facing node with being mapped on the OAC signal. The span-loss calculator 37 may also acquire the transmission power of the OAC signal from the frame terminator 42. The span-loss calculator 37 may also acquire the current Raman gain from the gain controller 36.

In addition, using the transmission power of the OAC signal, the entire reception power of the optical signal in the band of the OAC signal, the power of the optical noise, and the Raman gain, the span-loss calculator 37 calculates the above-mentioned Expression (2) to calculate the span loss (operation S32). For example, it is assumed that the transmission power of the OAC signal is +3.0 dBm and the Raman gain is 2.0 dB. It is assumed that the entire reception power of the optical signal in the band of the OAC signal is 0.003 mW and the power of the optical noise is 0.0000356 mW. When these values are substituted into the above-mentioned Expression (2) to calculate the Expression (2), the span loss becomes 30.28 dB.

After the calculation of the span loss, the processing returns to the operation S12, the operation S12 to the operation S32 are repeated. Therefore, during the operation of the DRA 61, it may be possible to measure the fluctuation of the SNR R in real time, it may be possible to continue measuring the span loss with accuracy. In addition, while the initial value Th1 is set as the threshold value, the threshold value is caused to change in an increasing direction, and then the threshold value is caused to change in a decreasing direction, the threshold value may also be caused to change in a decreasing direction, and then, caused to change in an increasing direction, after the setting of the threshold value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiver comprising:
   a converter configured to convert, into an electrical signal, an optical signal including error correction information, the optical signal being received from a transmitting side;
   a corrector configured to correct an error on the electrical signal, based on the error correction information;
   a threshold controller configured to control a threshold value discriminating a power of the electrical signal, based on a result of the error correction;
   a table configured to form therein data of a relationship between the threshold value and a power of an optical noise occurring when the optical signal is amplified within an optical transmission path between the transmitting side and the optical receiver;
   a deriving unit configured to obtain the power of the optical noise corresponding to the threshold value from the table;
   a gain controller configured to control a gain of the amplification based on a span loss in the optical transmission path;
   a pump light generator configured to generate pump light injected into the optical transmission path; and
   a pump light controller configured to control a transmission power of the pump light based on the gain of the amplification.

2. The optical receiver according to claim 1, wherein
   data of a relationship between the threshold value and a power ratio of an optical noise to an optical signal is stored in the table, and the deriving unit finds the power ratio corresponding to the threshold value from the table, and obtains a power of an optical noise, based on the power ratio and a reception power of the optical signal.

3. The optical receiver according to claim 2, wherein the data formed in the table is preliminarily obtained based on an experiment at a time of design of the optical receiver.

4. The optical receiver according to claim 1, wherein the deriving unit calculates the span loss in the optical transmission path, based on the transmission power of the optical signal notified from the transmitting side, a reception power of the optical signal, the power of the optical noise, and the gain of the amplification.

5. The optical receiver according to claim 4, wherein the data formed in the table is preliminarily obtained based on an experiment at a time of design of the optical receiver.

6. The optical receiver according to claim 1, wherein the data formed in the table is preliminarily obtained based on an experiment at a time of design of the optical receiver.

7. The optical receiver according to claim 1, wherein the data formed in the table is preliminarily obtained based on an experiment at a time of design of the optical receiver.

8. The optical receiver according to claim 1, wherein the data formed in the table is created, at a time of initial optical communication of the optical receiver, by waveforms of the optical signal corresponding to the transmission power of the pump light injected into the optical transmission path controlled by the pump light controller while disconnection and restoration of the optical signal are repeated.

9. An optical transmission system comprising:
an optical transmitter configured to transmit an optical signal including error correction information; and
an optical receiver configured to receive the optical signal, the optical receiver including
a converter configured to convert the received optical signal into an electrical signal;
a corrector configured to correct an error on the electrical signal, based on the error correction information;
a threshold controller configured to control a threshold value discriminating a power of the electrical signal, based on a result of the error correction;
a table configured to form therein data of a relationship between the threshold value and a power of an optical noise occurring when the optical signal is amplified within an optical transmission path between the optical transmitter and the optical receiver;
a deriving unit configured to obtain the power of the optical noise corresponding to the threshold value from the table;
a gain controller configured to control a gain of the amplification based on a span loss in the optical transmission path;
a pump light generator configured to generate pump light injected into the optical transmission path; and
a pump light controller configured to control a transmission power of the pump light based on the gain of the amplification.

10. The optical transmission system according to claim 9, wherein
data of a relationship between the threshold value and a power ratio of an optical noise to an optical signal is stored in the table, and
the deriving unit finds the power ratio corresponding to the threshold value from the table, and obtains a power of an optical noise, based on the power ratio and a reception power of the optical signal.

11. The optical transmission system according to claim 9, wherein the deriving unit calculates the span loss in the optical transmission path, based on the transmission power of the optical signal notified from the optical transmitter, a reception power of the optical signal, the power of the optical noise, and the gain of the amplification.

12. A span-loss monitoring method comprising:
receiving an optical signal including error correction information from a transmitting side;
converting the optical signal into an electrical signal;
correcting an error on the electrical signal, based on the error correction information;
controlling a threshold value discriminating a power of the electrical signal, based on a result of the error correction;
obtaining a power of an optical noise corresponding to the threshold value from a table in which data of a relationship between the threshold value and a power of an optical noise occurring when the optical signal is amplified within an optical transmission path formed between the transmitting side and an optical receiver;
controlling a gain of the amplification based on a span loss in the optical transmission path;
generating pump light injected into the optical transmission path; and
controlling a transmission power of the pump light based on the gain of the amplification.

13. The span-loss monitoring method according to claim 12, wherein
data of a relationship between the threshold value and a power ratio of an optical noise to an optical signal is stored in the table,
the power ratio corresponding to the threshold value is found in the table, and
a power of an optical noise is obtained based on the power ratio and a reception power of the optical signal.

14. The span-loss monitoring method according to claim 12, further comprising:
calculating the span loss in the optical transmission path, based on the transmission power of the optical signal notified from the transmitting side, a reception power of the optical signal, the power of the optical noise, and the gain of the amplification.

* * * * *